United States Patent
Wiegner et al.

(10) Patent No.: US 8,440,782 B2
(45) Date of Patent: May 14, 2013

(54) TITANIUM-BASED CATALYST SHOWING EXCELLENT ACTIVITY AND SELECTIVITY IN POLYCONDENSATION REACTIONS

(75) Inventors: Jens-Peter Wiegner, Halle (DE); Volkmar Voerckel, Merseburg (DE); Dietmar Runkel, Merseburg (DE); Rolf Eckert, Halle (DE)

(73) Assignee: Equipolymers GmbH, Schkopau (DE)

( * ) Notice: Subject to any disclaimer, the term of this patent is extended or adjusted under 35 U.S.C. 154(b) by 0 days.

(21) Appl. No.: 13/592,924

(22) Filed: Aug. 23, 2012

(65) Prior Publication Data

US 2012/0316316 A1 Dec. 13, 2012

Related U.S. Application Data

(62) Division of application No. 12/933,950, filed as application No. PCT/IB2009/000574 on Mar. 23, 2009.

(60) Provisional application No. 61/072,230, filed on Mar. 28, 2008.

(51) Int. Cl.
*C08G 63/00* (2006.01)
*C08G 63/02* (2006.01)

(52) U.S. Cl.
USPC ............... 528/279; 528/272; 502/100

(58) Field of Classification Search ......... 528/272, 528/279
See application file for complete search history.

(56) References Cited

U.S. PATENT DOCUMENTS

| | | |
|---|---|---|
| 4,131,601 A | 12/1978 | Matsuyama et al. |
| 4,482,700 A | 11/1984 | Kuhnrich et al. |
| 5,302,690 A | 4/1994 | Kuniaki et al. |
| 5,744,571 A | 4/1998 | Hilbert et al. |
| 5,905,136 A | 5/1999 | Po et al. |
| 2005/0009687 A1 | 1/2005 | Verkade et al. |
| 2005/0215425 A1 | 9/2005 | Dale et al. |

FOREIGN PATENT DOCUMENTS

WO 9745470 12/1997

OTHER PUBLICATIONS

Vercarde, et al., Coordination Chemistry Reviews (1194), 137, 233-295.

*Primary Examiner* — Ling Choi
*Assistant Examiner* — Gennadiy Mesh
(74) *Attorney, Agent, or Firm* — Knobbe, Martens, Olson & Bear, LLP

(57) ABSTRACT

Method for producing polyesters using titanium atrane catalysts is disclosed. Also disclosed are methods for making the titanium atrane catalysts. The titanium atrane catalysts are useful as esterification and/or polycondensation catalysts, have similar activity, color and byproduct formation as conventional catalyst systems, but with reduced toxicity and regulatory concerns.

9 Claims, No Drawings

TITANIUM-BASED CATALYST SHOWING EXCELLENT ACTIVITY AND SELECTIVITY IN POLYCONDENSATION REACTIONS

BACKGROUND OF INVENTION

Polyesters such as, for example, polyethylene terephthalate, polytrimethylene terephthalate and polybutylene terephthalate, are a class of important industrial polymers. They are widely used in thermoplastic fibers, films, and molding applications.

Polyesters can be produced by esterification of an acid such as terephthalic acid (TPA) with a glycol followed by polycondensation. A catalyst is used to catalyze the polycondensation and may be used to catalyze the esterification.

Antimony is often used as a catalyst for the esterification and polycondensation reaction. However, antimony-based catalysts are coming under increased environmental pressure and regulatory control, especially in food contact and fiber applications. Antimony-based catalysts may also cause problems with grey discoloration. Tin compounds can also be used in the esterification and polycondensation reactions. However, tin-based catalysts have similar toxicity and regulatory concerns.

Titanium-based catalysts, either alone or in combination with other compounds, have been described for use in the preparation of polyesters in U.S. Pat. Nos. 4,482,700, 4,131,601, 5,302,690, 5,744,571, 5,905,136, and in WO 97/45470. U.S. Patent Publication 2005/0009687 describes the use of titanium alkoxide catalyst for the polymerization of cyclic esters in particular. There has been some concern that titanium catalysts, if used in the esterification and polycondensation reactions, tend to hydrolyze on contact with water forming glycol-insoluble oligomeric species, which lose catalytic activity, as described in U.S. 2005/0215425. Esters and polyesters produced using certain titanium compounds as catalysts may also suffer from yellow discoloration, as described in U.S. Pat. Nos. 4,131,601 and 4,482,700.

There is a need for a catalyst system for the synthesis of polyesters, in particular polyethylene terephthalate and its copolyesters, having increased catalytic activity, no or only minimal effect on the properties of the polyester, and reduced toxicity concerns.

SUMMARY OF THE INVENTION

In one aspect, the present invention is a method for producing a polyester comprising esterifying a polyacid and a polyol to produce an oligomer; and polymerizing the oligomer by way of polycondensation in the presence of an atrane containing catalyst to form an acyclic polyester.

In a second aspect, the present invention is a catalyst comprising a titanium atrane for use in acyclic ester polycondensation.

In a third aspect, the present invention is a method for making a titanium atrane catalyst comprising: (a) contacting a solution comprising a titanium (IV) alkoxide compound and a first solvent with an organic acid; (b) contacting the solution formed in step (a) with a substituted or unsubstituted trialkanolamine to form an impure catalyst; and (c) purifying the impure catalyst to form the titanium atrane catalyst.

It is an object of the present invention to provide a polycondensation catalyst for the manufacture of acyclic polyesters that has similar activity to the antimony-based catalyst systems used in the past, but with reduced toxicity and regulatory concerns. It is also an object of the present invention to provide a catalyst system that results in acceptable color and byproduct formation during the processing of acyclic polyesters as compared to commonly used antimony-based catalyst systems. An example of byproduct formation is the formation of acetaldehyde that is formed during resin production and regenerated during processing. Most titanium catalysts have high acetaldehyde regeneration rates compared to antimony, but the catalysts of the present invention provide a solution to the problem of regenerated acetaldehyde.

DETAILED DESCRIPTION OF THE EMBODIMENTS

In the manufacture of high molecular weight acyclic polyesters (such as polyethylene terephthalate (PET), polybutylene terephthalate (PBT), polytrimethylene terephthalate (PTT), and polyethylene naphthalate (PEN), several main reations take place. The first one is an esterification reaction, in which a polyacid and a polyol are esterified. Suitable polyacids include terephthalic acid, isophthalic acid, cyclohexanedicarboxylic acid, naphthalenedicarboxylic acid; and long chain branching polyacids like trimesinic acid, trimellitic acid, and its anhydride. Suitable polyols include diethylene glycol, cyclohexanedimethanol, 1,3-propanediol, 2,2-dimethylpropanediol-1,3, 1,4-butanediol, isosorbide; aromatic polyols such as resorcinol, hydroquinone; and long chain branching polyols such as trimethylolpropane and pentaerythritol. In the case of PET, the polyacid is terephthalic acid and the polyol is typically ethylene glycol.

The esterification step can be carried out without any catalyst (autocatalysis), but typically, antimony compounds are able to catalyze the esterification reaction. The esterification step is typically conducted at a temperature of above 200° C., more preferably at a temperature of from 240° C. to 270° C., and at a pressure of from 1 to 10 bar. During the esterification reaction, water is formed as a reaction product. In some cases, vinyl alcohol, which isomerizes extremely fast to acetaldehyde, is formed as a byproduct.

The second main reaction is referred to as polycondensation, which is extremely important for molecular weight build-up of the polyester. The polycondensation reaction may include two phases, a melt phase and a solid state phase. Typically, the melt phase of the polycondensation step is conducted at a temperature of from 240° C. to 290° C. and under vacuum between 3 and 0.1 mbar. Typically, the solid state phase of the polycondensation step is conducted at a temperature of from 190° C. to 230° C. and may be conducted either under nitrogen flow or under vacuum between 3 and 0.1 mbar.

As the molecular weight of the polymer builds, the polycondensation reaction produces ethylene glycol and some water. Titanium compounds are typically extremely sensitive to water, as they often undergo hydrolysis to produce catalytically inactive titanium species. For this reason, the structure of the titanium compound is very important in order to maintain activity during the polycondensation reaction. Surprisingly, the titanium atrane catalysts of the present invention retain significant catalytic activity during both of the polycondensation reactions. (melt and solid state).

Atranes are comprised of two bridgehead atoms bridged by three atom moieties. When the bridgehead atoms interact, a (3.3.3.0) tricyclic system is produced (Vercade et al.; Coordination Chemistry Reviews (1994), 137, 233-295). In the catalysts of the present invention, the atrane is a titanium atrane having the following structure:

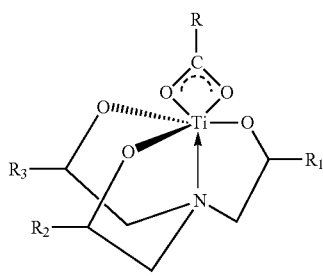

wherein R is H, $C_1$-C26 alkyl-, aryl-, or hetaryl; $R_1$ is H, or methyl-, or ethyl- or ethenyl- or aryl, or hetaryl; $R_2$ is H, or methyl- or ethyl- or ethenyl-, or aryl-, or hetaryl and $R_3$=H, or methyl- or ethyl-, or ethenyl-, or aryl-, or hetaryl-.

In the titanium atrane catalysts of the present invention, all of the six coordination sites on the titanium atom are occupied. Four sites are occupied by a first ligand (three regular and one dative bonds) and two sites are occupied by a second ligand (one regular and one dative bond). The first ligand is a substituted or unsubstitued trialkanolamine, and is preferably triethanolamine, tri-isopropanolamine, or a substituted triethanolamine. The second ligand is an organic acid. Any acid may be used, but preferably the acid is a carboxylic acid, and even more preferably the second ligand is acetic acid or propionic acid. The titanium atrane catalysts of the present invention only contain one titanium atom per molecule, such that no significant bridging with other molecules occurs.

The titanium atrane catalysts of the present invention are used in both the melt phase and the solid state phase of the polycondensation step at a concentration of from 5 to 250 ppm. The catalyst may be added in the form of a powder, in which case it may be added to the polyacid and polyol (the mixture of these referred to herein as "paste") before the esterification reaction. Alternatively, a catalyst-containing solution may be prepared comprising the catalyst and a suitable polyol such as ethylene glycol. The catalyst-containing solution may be added to the paste, directly to the esterification reaction, or directly to the polycondensation reaction. The manner of addition is not critical, so long as direct contact with water, especially at higher temperatures, is avoided before the catalyst is added to the reaction mixture. The catalyst works at the same temperatures and pressures as antimony catalysts typically described in the prior art.

The titanium atrane catalysts of the present invention may be synthesized using the following steps: First, an alcohol solution is prepared by adding a titanium (IV) alkoxide to a first solvent. Preferably the first solvent is the alcohol corresponding to the alkoxide in the titanate. For example, if titanium n-butylate is the titanate used, then preferably the first solvent is n-butanol. Likewise, if titanium n-propylate is the titanate, then 1-propanol is the preferred first solvent; if titanium iso-propylate is the titanate, then iso-propyl alcohol is the preferred first solvent; if titanium t-butylate is the titanate, then t-butanol is the preferred first solvent; if titanium ethylate is the titanate, then ethylalcohol is the preferred first solvent; and so forth. The alcohol solution is prepared under nitrogen.

Next, an organic acid is added slowly under nitrogen to the alcohol solution in an amount such that the molar ratio of titanate to organic acid is 1:1. A solution of an acid-substituted titanate results. Preferably, the acid is a carboxylic acid. More preferably, the carboxylic acid is acetic acid. Preferably, the organic acid is added to the alcohol solution at a temperature of from 20° C. to 50° C. and at normal pressure.

Next, a substituted or unsubstituted trialkanolamine is added slowly under nitrogen to the acid-substituted titanate solution in an amount such that the molar ratio of titanate to trialkanolamine is 1:1. Preferably, the trialkanolamine is triethanolamine, tri-isopropanolamine, or a substituted triethanolamine. Preferably, the trialkanolamine is added to the solution of the acid-modified titanate at a temperature of from 20° C. to 50° C. and at normal pressure. The result is a mixture comprising impure catalyst in the form of a solid precipitate, liquid alcohol, and impure catalyst dissolved in the liquid alcohol.

Optionally, the solid precipitate may be separated from the rest of the mixture, for example, by way of filtration, and the solid precipitated catalyst may then be purified as described below. Preferably, however, the solid precipitate is left to remain with the rest of the mixture and the entire mixture is purified as described below.

The impure catalyst is then purified. First, the first solvent is removed by way of evaporation under vacuum at temperatures below 50° C., leaving a solid precipitate. The solid precipitate is then added to a second solvent such as, for example, toluene between 1 and 50 weight % of catalyst, based on the weight of toluene, and boiled to remove residual substances such as alcohol, ester and traces of water. The resultant suspension is hot filtered, and the (white) filter cake was dried and stored under vacuum.

The resulting titanium atrane catalyst may be used for the manufacture of resins used for bottles, films, fibers, and other applications. The titanium atrane catalysts of the present invention may also be used for different processes, such as, for example, the so referred to as "high IV processes".

It is possible to add small amounts of the titanium atrane catalysts described herein to the conventional catalysts such as antimony or germanium-based catalysts, in order to increase capacity. Even up to 10 ppm titanium atrane catalyst (2 ppm titanium) can increase polycondensation and esterification rates so as to increase capacity.

EXAMPLES

Methods

The following methods are used in the examples.

Intrinsic Viscosity measurement

Sample Preparation 20 grams of resin pellets are ground using liquid nitrogen as coolant. The resulting powder is dried at 100° C. for 2 min. Solvent (Mixture of 50% o-Dichlorobenzene and 50% Phenol) is added to 250 mg of the dried powder in sufficient amount to result in a 0.5 g/dl concentration solution. The solution is heated at 130° C. for 30 minutes during stirring, and then cooled to 25° C. The resulting cooled solution is placed into a Schott Viscosimeter.

Measurement

Measurements are performed with a Micro-UBBELO-HDE-Viscosimeter Type No. 536 20 Capillary MII (corresponds with DIN 51 562 Part2). Number of drop time measurements is 3. Upper limit of accepted drop time deviation is 0.2%. Upper limit of temperature tolerance: 25° C.+−0.03 K. Calculation is according to BILLMEYER equation in dl/g.

Color measurement

Equipment
  Spectralphotometer LUCI 100 (Dr. Lange GmbH) with SPECTRAL QC software
  Spectral range: 380-720 nm
  Principle: diffuse reflection, d/8°
  Cuvette: 34 mm, height 25 mm
  Measuring spot: 10 mm
  Illuminant: daylight D65/10
Reference:
  Black and white standards (LZM 128)
  The equipment is used when the reference standards reach the following XYZ values. With bigger variation, a new calibration step on the LUCI 100 is necessary

|   | black | white |
|---|---|---|
| X | $3.75 \pm 0.02$ | $93.97 \pm 0.02$ |
| Y | $3.97 \pm 0.02$ | $99.21 \pm 0.02$ |
| Z | $4.36 \pm 0.02$ | $106.52 \pm 0.02$ |

Procedure:
  The sample is measured as pellets. The cuvette must be clean and is filled to at least ¾ full. The sample is measured eight times, and for each measurement the cuvette is filled with new pellets. The average value of all 8 measurements is calculated using SPECTRAL QC software

Acetaldehyde Generation Determination

The resin is processed on an ES 200-50 injection molding machine (Engel Co.) with a 30 millimeter diameter screw and a length:diameter ratio of 20. The dried resin is fed to the material hopper of the injection molding machine, to which a nitrogen curtain is applied. The resin is processed at temperature between 270° C. and 300° C. The resulting melt is then injected into a cooled mold under pressure. Processing parameters:
Drying:
  Instrument: circulated air drying oven UT20 by Heraeus Instruments.
  Temperature: 120° C.
  Duration; 12 hours.
Injection molding
  Machine: ES 200-50 by Engel Co.
  Cylinder temperatures: 277/277/277/277° C.
  Screw speed: 42 rpm
  Cooling time: 10 seconds
  Dwell pressure time: 10 seconds
  Melt retention time: 2.5 minutes.

The acetaldehyde content of the processed resins is determined according to the following method: At first, the various materials are ground with a 1 mm screen in a centrifugal mill by RETSCH Co. (ZM1) in the presence of liquid nitrogen. Approximately 0.1 g to 0.3 g of the ground material is put into a 22 ml sample bottle and sealed with a polytetrafluoroethylene seal. The sample bottles are heated under controlled temperature in a headspace oven (HS-40 XL headspace autosampler by Perkin Elmer) at 150° C. for 90 minutes, and subsequently analyzed through gas chromatography (XL GC AutoSystem by Perkin Elmer) with an external standard. The calibration curve is prepared through complete evaporation of aqueous solutions of different acetaldehyde contents.

The equipment specifications for the acetaldehyde determination are as follows:
Headspace autosampler conditions:
  Oven temperature: 150° C.
  Needle temperature: 160° C.
  Transfer line temperature: 170° C.
  Retention Time: 90 minutes
Gas chromatograph conditions:
  Column: 1.8 m×⅛ in. stainless steel
  Packing: Porapack Q, 80/100 mesh
  Carrier gas: nitrogen, 30 ml/min
  Fuel gas: hydrogen
  Air: synthetic air
  Column temperature: 140° C.
  Detector temperature: 220° C.

The trials are conducted in a 200 L batch reactor (Pisticci Mini Plant). This reactor is equipped with a spiral agitator with hydraulic drive (speed control system for constant speed/torque measurement) and an oil heating system (max. temperature 300° C.) for the reactor and a second heating system (275° C.) for the outlet valve/hole plate. The spiral agitator transports the product from the bottom up on the wall with a space to the wall of 1.5 cm. The filling level in the reactor is approx. 40%.

Example 1

Titanium Atrane Catalyst Preparation 0.4 moles of titanium n-butylate are added under stirring to 500 mL n-butanol in a nitrogen atmosphere at room temperature. After this, 24 g glacial acetic acid (0.4 moles) are added at room temperature slowly to the solution of titanium n-butylate in n-butanol. The color of the solution changes to slightly yellow. It is stirred for additional 10 minutes. 59.67 g triethanolamine are added dropwise to the stirred solution. The temperature increases by about 2 K during the addition of the amine. The mixture is stirred at room temperature. During this time a white precipitate forms. The mixture is stirred for a certain period of time (between 0.5 and 50 h).

The solvent (and reaction product) n-butanol is evaporated under vacuum at temperatures below 50° C.

The resulting off-white to amber solid is added to 500 ml toluene. It is boiled in this solvent to remove alcohol, ester and water traces. The resultant suspension is hot filtered, and the (white) filter cake was dried and stored under vacuum. The resulting atrane has a melting point of greater than 200° C. The yield is in the range of 60 to 90% (based on titanium).

Example 2

Pet Produced Using Titanium Atrane Catalyst

Recipe for trial using titanium catalyst:
Monoethylene glycol (MEG) (29.5 kilograms), 34.65 grams of an aqueous solution of tetramethylammonium hydroxide (TMAH, used to inhibit formation of diethylene glycol) (50 ppm), 15 parts per million (ppm) titanium as catalyst (added as 5.9 g titanium atrane), and a colorant comprising Polysynthren RBL (0.288 g or 4 ppm) and Polysynthren GFP (4 ppm), are fed into the paste mixer. Under stirring (2 stirrers at 3,600 min$^{-1}$), 60.675 kilograms of purified terephthalic acid (PTA) and 1.44 kilograms of isophthalic acid (IPA) are added into a paste mixer, which is a vessel used to mix the raw materials before being fed into a reactor. The reactor is purged with nitrogen for approximately 5 minutes. The MEG/PTA paste is then fed into the reactor. After esterification the pressure is decreased to 1.5 bar (absolute) in 10 minutes; followed by the addition of a phosphorous compound which is added as a stabilizer (2.675 g phosphoric acid or 10 ppm phosphorous.)

Esterification:

The set points for reactor temperature and pressure for the first step of esterification are approximately 235° C. and 2.6 bar (absolute). The stirrer speed is 80 min$^{-1}$. In the column the gas phase is separated into ethylene glycol (EG) and water. The EG is recycled back to the reactor. The condensed water (at the top of the column) is collected in a tank. During the esterification time the product temperature increases to 270° C. The esterification run lasts approximately 200 minutes.

Melt phase polycondensation:

After esterification the absolute pressure of the reactor is decreased in four steps:
1. Decreasing the pressure to 1.5 bar (absolute) in 10 minutes; addition of the phosphorous stabilizer compound (phosphoric acid);
2. Decreasing the pressure to 1 bar (absolute).
3. Decreasing the pressure to 400 mbar (absolute) in 15 minutes.
4. Decreasing the pressure to 100 mbar (absolute) in 15 minutes followed by a fast decrease to 2-4 mbar (absolute).

The phosphorous compound is given into the reactor from a separate catalyst tank. The catalyst tank is purged with nitrogen before adding the solution of phosphoric acid in ethylene glycol. By a fixed value for the hydraulic pressure (5 bar) the stirrer speed is decreased to 35 min$^{-1}$. During the polycondensation, the product temperature increased to 275° C. The polycondensation is finished at a fixed value for the hydraulic pressure of the hydraulic drive. During the emptying of the reactor after the melt phase the highly viscous polyester is cooled in a water bath, and the thus formed strands are pelletized.

Solid State Polycondensation (SSP)

The SSP reactor is a fluidized bed reactor (pulse bed) from the BÜHLER company. The reactor has a batch capacity of 3 kilograms. The PET pellets are treated in a hot nitrogen stream (125 Nm3/h) at normal pressure. Crystallization, drying and SSP are batch processes with the same nitrogen flow. Approximately 10% of the nitrogen is removed from the stream after passing the pellets and is replaced with fresh nitrogen. The dew point of the nitrogen is −55° C. Table 1 shows the results.

Comparative Example 3—PET Produced Using Conventional Antimony-Based Catalyst

The procedures described for Example 2 are followed, except the following recipe substituted for that in Example 2:

MEG (29.5 kilograms), 34.65 grams TMAH (50 ppm), 230 ppm antimony (added as 40.25 g antimony acetate, used as the catalyst), and 10 ppm cobalt (added as 3.035 g cobalt acetate, used as a colorant) are fed into the paste mixer. Under stirring (2 stirrers at 3,600 min$^{-1}$), 60.675 kilograms PTA and 1.44 kilograms IPA are added into the paste mixer. The reactor is purged with nitrogen for approximately 5 minutes. The MEG/PTA paste is fed into the reactor. After esterification the pressure is decreased to 1.5 bar (absolute) in 10 minutes; followed by the addition of a phosphorous compound (2.675 grams phosphoric acid or 10 ppm phosphorous) used as a stabilizer. Esterification, Melt phase polycondensation and solid state polycondensation are carried out as described in Example 2. Table 1 shows the results.

TABLE 1

| | Duration of melt phase polycondensation (min) | Intrinsic Viscosity (IV) (melt phase) (dl/g) | Color b (melt phase) | IV (SSP) (dl/g) | Color b (SSP) | Acetaldehyde (ppm) |
|---|---|---|---|---|---|---|
| Example 2 | 82 | 0.5975 | −0.2 | 0.736 | −0.35 | 14.7 |
| Comparative Example 3 | 102 | 0.6255 | −0.39 | 0.819 | 0.6 | 15.7 |

These results show equivalent results between the titanium atrane catalysts of the present invention and antimony catalysts traditionally used for esterification and polycondensation reactions.

What is claimed is:

1. A method for producing a polyester comprising:
   esterifying a polyacid and a polyol to produce a monomer; and
   polymerizing the monomer by way of polycondensation in the presence of an atrane-containing catalyst to form a polyester, wherein the atrane-containing catalyst has the following structure:

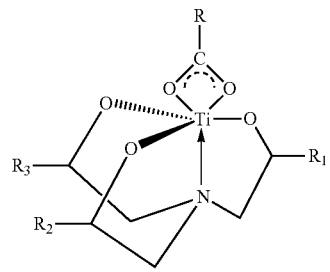

wherein R is H, $C_1$-$C_{26}$ alkyl-, aryl-, or hetaryl; $R_1$ is H, or methyl-, or ethyl- or ethenyl- or aryl, or heteraryl; $R_2$ is H, or methyl- or ethyl- or ethenyl, or aryl-, or hetaryl; and $R_3$ is H, or methyl- or ethyl-, or ethenyl-, or aryl-, or hetaryl-.

2. The method according to claim 1 wherein the polyacid is terephthalic acid, isophthalic acid, cyclohexanedicarboxylic acid, naphthalinedicarboxylic acid, trimesinic acid, trimellitic acid or its anhydride.

3. The method according to claim 2 wherein the polyol is ethylene glycol, diethylene glycol, cyclohexanedimethanol, 1,3-propanediol, 1,4-butanediol, isosorbide, resorcinol, hydroquinone, trimethylolpropane, or pentaerythritol.

4. The method according to claim 3 wherein the polyester is polyethylene terephthalate, polybutylene terephthalate, polytrimethylene terephthalate, or polyethylene naphthalate.

5. The method according to claim 4 wherein the catalyst is present in the polycondensation step in a concentration of from 5 to 250 ppm.

6. The method according to claim 1 wherein the esterification step is conducted at a temperature of above 200° C.

7. The method according to claim 1 wherein the polycondensation step, comprising a melt phase and a solid state phase, is conducted at a temperature of from 260° C. to 290° C. for the melt phase and a temperature of from 190° C. to 230° C. for the solid state phase.

8. The method according to claim 1 wherein the esterification step is conducted at a pressure of from 1 to 10 bar.

9. The method according to claim 1 wherein the polycondensation step, comprising a melt phase and a solid state phase, is conducted at a pressure of from 3.0 to 0.1 mbar.

* * * * *

UNITED STATES PATENT AND TRADEMARK OFFICE
CERTIFICATE OF CORRECTION

PATENT NO.       : 8,440,782 B2
APPLICATION NO.  : 13/592924
DATED            : May 14, 2013
INVENTOR(S)      : Wiegner et al.

It is certified that error appears in the above-identified patent and that said Letters Patent is hereby corrected as shown below:

In the Specification

Column 2 at line 19, Change "reations" to --reactions--.

Column 3 at line 16, Change "$C_1$-C26" to --$C_1$-$C_{26}$--.

Column 3 at line 26, Change "unsubstitued" to --unsubstituted--.

Column 4 at line 60, Change "Viscosimeter." to --Viscometer--.

Column 4 at line 63, Change "Viscosimeter." to --Viscometer--.

Column 5 at line 16, Change "necessary" to --necessary.--.

Column 5 at line 30, Change "software" to --software.--.

In the Claims

Column 8 at line 41, Claim 1, Change "heteraryl;" to --heteroaryl;--.

Column 8 at line 47, Claim 2, Change "naphthalinedicarboxylic" to --naphthalenedicarboxylic--.

Signed and Sealed this
Fifteenth Day of October, 2013

Teresa Stanek Rea
*Deputy Director of the United States Patent and Trademark Office*